United States Patent [19]
Burkart et al.

[11] Patent Number: 5,620,794
[45] Date of Patent: Apr. 15, 1997

[54] RELEASABLE ADHESIVE JOINT, A METHOD FOR ESTABLISHING A RELEASABLE ADHESIVE JOINT AND AN APPARATUS FOR RELEASING SUCH ADHESIVE JOINTS

[75] Inventors: Günter Burkart, Rufi; José Mena, Bülach; Ulrich Tribelhorn, Ebikon, all of Switzerland

[73] Assignee: Gurit-Essex AG, Freienbach, Switzerland

[21] Appl. No.: 466,149

[22] Filed: Jun. 6, 1995

Related U.S. Application Data

[63] Continuation of Ser. No. 907,485, Jul. 1, 1992, abandoned.

[51] Int. Cl.⁶ .................... E06B 3/00; B32B 7/12
[52] U.S. Cl. .................... 428/343; 52/208; 52/99
[58] Field of Search ............... 428/343; 52/208, 52/99, 173 R

[56] References Cited

U.S. PATENT DOCUMENTS

| | | | |
|---|---|---|---|
| 3,344,573 | 10/1967 | Martin et al. | 52/400 X |
| 4,304,808 | 12/1981 | Priest . | |
| 4,555,607 | 11/1985 | Roentgen et al. . | |
| 4,569,870 | 2/1986 | Shinmi . | |
| 4,635,415 | 1/1987 | Schumacher et al. . | |
| 4,879,853 | 11/1989 | Braendle et al. . | |
| 4,933,032 | 6/1990 | Kunert . | |
| 4,986,867 | 1/1991 | Braendle et al. . | |
| 4,994,315 | 2/1991 | Schreiber et al. . | |
| 5,069,012 | 12/1991 | Riederer . | |
| 5,205,095 | 4/1993 | Kessler . | |

FOREIGN PATENT DOCUMENTS

| | | |
|---|---|---|
| 0081426 | 1/1983 | European Pat. Off. . |
| 0128837 | 10/1983 | European Pat. Off. . |
| 0121481 | 3/1984 | European Pat. Off. . |
| 0258128 | 10/1987 | European Pat. Off. . |

*Primary Examiner*—Daniel Zirker
*Attorney, Agent, or Firm*—Tarolli, Sundheim, Covell, Tummino & Szabo

[57] ABSTRACT

The invention provides a releasable adhesive joint between two elements. The two elements are fixed to each other by means of an adhesive bead or by means of two or more adhesive beads. The adhesive joint comprises a heatable separating member closely fitting the adhesive bead or embedded in the adhesive bead, or closely fitting or embedded in one of the adhesive beads. The heatable separating member looses the adhesion to the closely fitting parts of the adhesive joint or is destroyed upon heating the heatable separating member to a temperature at which the adhesive bead is not yet damaged, thus releasing the parts of the adhesive bead closely fitting the heatable separating member. This releasable adhesive joint is especially useful in fixing vehicle glass panes to a vehicle body frame.

6 Claims, 2 Drawing Sheets

RELEASABLE ADHESIVE JOINT, A METHOD FOR ESTABLISHING A RELEASABLE ADHESIVE JOINT AND AN APPARATUS FOR RELEASING SUCH ADHESIVE JOINTS

This is a continuation of application Ser. No. 07/907,485, filed on Jul. 1, 1992, now abandoned.

BACKGROUND OF THE INVENTION

The present invention refers, according to a first aspect, to a releasable adhesive joint between two elements in which the two elements are fixed to each other by means of an adhesive bead. According to a second aspect, the present invention further relates to a method for establishing a releasable adhesive joint between two elements by providing an adhesive bead of particular design between the two elements to be fixed to each other. In a third and final aspect, the present invention further relates to an apparatus for releasing such an adhesive joint fixing two elements to each other.

In the following, in accordance with the common linguistic usage, the expression "adhesive joint" is used for a connection or fixture between two rigid elements by means of one or a plurality of beads of adhesive material provided between the two elements to be fixed to each other. Such adhesive joints are very well suited, for instance, for mounting vehicle windows in the body of the vehicle; examples of such adhesive joints are disclosed e.g. in the European Patent Publications EP-A1-0 312 496 and EP-A1-0 351 369. However, the usage and application of such adhesive joints is not limited at all for mounting windows in a vehicle body.

Even if this kind of glazing is very favourable and may be successfully used in mounting panes or windows in a vehicle body in a quick and efficient way, the problem exists that the pane or window must be removed from the vehicle body in the case of repair of a broken pane or in the case of disassembling the vehicle for recycling purposes. Up to now, no efficient and quickly to perform solution has been known for releasing the adhesive joints between two elements, e.g. between a vehicle pane and the vehicle body.

OBJECTS OF THE INVENTION

It is an object of the invention to provide a releasable adhesive joint between two elements, particularly between a vehicle pane and a vehicle body, which can be released quickly and efficiently in the case of repair or disassembling the vehicle.

It is a further object of the invention to provide a method of establishing a releasable adhesive joint between two elements, particularly between a vehicle pane and a vehicle body, by means of which such a releasable adhesive joint can be realized.

It is a still further object of the invention to provide an apparatus for releasing such a releasable adhesive joint in a convenient and efficient way.

SUMMARY OF THE INVENTION

To meet these and other objects, the invention provides, according to a first aspect of the invention, a releasable adhesive joint between two elements which are fixed to each other by means of an adhesive bead. The adhesive joint comprises a heatable separating member closely fitting the adhesive bead or embedded in the adhesive bead. The heatable separating member looses the adhesion to the closely fitting parts of the adhesive joint or is destroyed upon heating the heatable separating member to a temperature at which the adhesive bead is not yet damaged, thus releasing the parts of the adhesive bead closely fitting the heatable separating member.

According to a second aspect, the invention further provides a releasable adhesive joint between two elements which are fixed to each other by means of a plurality of adhesive beads. Thereby, the adhesive joint comprises a heatable separating member closely fitting one of the adhesive beads or is embedded in one of the adhesive beads. The heatable separating member looses the adhesion to the closely fitting parts of the adhesive joint or is destroyed upon heating the heatable separating member to a temperature at which the one of the adhesive beads closely fitting or containing the heatable separating member is not yet damaged, thus releasing the parts of the one of the adhesive beads closely fitting the heatable separating member.

To sum up it can be said that the releasable adhesive joint of the invention generally comprises a heatable separating member which either is in close contact to the adhesive bead as well as to one of the elements to be fixed to another one, or in close contact to one of the adhesive beads as well as to one of the elements to be fixed to another one in the case where more than one adhesive beads are used for the adhesive joint, or is embedded in the adhesive bead used to fix one element to another one, or is embedded in one of the adhesive beads in the case where more than one adhesive beads are used for the adhesive joint. In any case, upon heating the heatable separating member to a predetermined temperature, it looses the adhesion to the closely fitting parts of the adhesive joint, i.e. to the adhesive bead located next to it, or it is even destroyed, with the result that the parts of the adhesive bead closely fitting the heatable separating member are released and, consequently, the adhesive joint is weakened or even destroyed to such an extent that the two elements can be separated from each other without difficulties.

According to a particular embodiment, the heatable separating member can be located on the surface of one of the two members to be fixed together and reliably fixed thereto. Thereby, the adhesive bead or one of the adhesive beads used to fix the two elements to each other is applied onto the surface of the heatable separating member. According to another embodiment, the heatable separating member can be located in the interior of the adhesive bead, if only one adhesive bead is used, or in the interior of one of the adhesive beads, if two or more adhesive beads are used.

Advantageously, the heatable separating member has the shape and configuration of a flat body member. For instance, it can be provided in the form of a thin layer, particularly a thin film or foil, made of an electrically conducting thermoplastic material. The thin layer and the thin film or foil, respectively, is provided with electrical connector means for the supply of electric current.

According to another embodiment, the heatable separating member can be constituted by a thin film or foil made of a plastic material which can be heated by the application of high frequency, micro wave or infrared radiation.

In an embodiment of the releasable adhesive joint according to the invention in which two adhesive beads are provided, one of the adhesive beads itself can be designed as the heatable separating member. In this case, the said one of the adhesive beads is made of such a material which looses the adhesion to the adjacent and closely fitting second adhesive bead at a temperature at which said second adhesive bead is not yet damaged. It is even possible to design said one of the adhesive beads as a separating member which is destroyed at a temperature at which the second adhesive bead is not damaged. In any case, the second adhesive bead is released and the two element fixed to each other can be separated easily.

An important point is that the separating element looses its adhesion to the remaining parts of the adhesive joint or is destroyed at such a temperature at which the heat transferred to the related adhesive bead cannot damage it. If the usual adhesive materials are used, a damage of the adhesive bead would occur at a temperature of about 200° to 250° C. It is understood that the damaging process is time dependent. Due to the low thermal conductivity of the plastic materials used as adhesive agents, the temperature of the separating member can be considerably higher than the temperature at which the adhesive material is damaged, but only during a short time period.

The invention further provides a method for establishing a releasable adhesive joint between to elements to be fixed to each other.

According to a first variation of the method, there is provided an adhesive bead and a heatable separating member closely fitting the adhesive bead or embedded in the adhesive bead, the heatable separating member loosing the adhesion to the closely fitting elements or parts of the adhesive joint or being destroyed upon heating it to a temperature at which the adhesive bead is not yet damaged, thus releasing the parts of the adhesive bead closely fitting the heatable separating member. Then, the adhesive bead is applied to one of the elements to be fixed to each other, and the other one of the elements is pressed against the adhesive bead.

According to a second variation of the method, a plurality of adhesive beads and a heatable separating member closely fitting one of these adhesive beads or embedded in one of these adhesive beads are provided, whereby the heatable separating member looses the adhesion to the closely fitting elements or parts of the adhesive joint or is destroyed upon heating it to a temperature at which the one of the adhesive beads closely fitting or containing the separating member is not yet damaged, thus releasing parts of the one of the adhesive beads closely fitting or containing the heatable separating member. Then, the plurality of adhesive beads is applied to one of the elements to be fixed to each other, and finally the other of the elements is pressed against the adhesive bead.

According to a third variation of the method, there is provided a first adhesive bead and a heatable separating member closely fitting the first adhesive bead or embedded in the first adhesive bead, whereby the heatable separating member looses the adhesion to the closely fitting elements or parts of the adhesive joint or being destroyed upon heating it to a temperature at which the first adhesive beads is not yet damaged, thus releasing the parts of the first adhesive bead closely fitting the heatable separating member. Then the first adhesive bead is applied to one of the elements to be fixed to each other. Thereafter, the first adhesive bead equipped with or closely contacting the heatable separating member is cured. Finally, a second adhesive bead is applied onto the cured first adhesive bead, and the other one of the two elements is pressed to the second adhesive bead.

If the heatable separating member is to be embedded into the adhesive bead or into one of the adhesive beads prior to applying the adhesive bead to on of the two elements to be fixed to each other, the embedding is advantageously performed by coextrusion of the heatable separating member together with the corresponding adhesive bead.

However, it is also possible to apply the heatable separating member to the surface of one of the two elements to be fixed to each other prior to applying the adhesive bead or one of the adhesive beads, for instance by spraying, painting or printing a layer of suitable material, or by rolling-on an electrically conducting plastic material film or foil, or by rolling-on a plastic material film or foil which can be heated by means of high frequency, micro wave or infrared radiation, or by applying a plastisol to the surface of one of the two elements to be fixed to each other which plastisol can be heated under the influence of high frequency, micro wave or infrared radiation.

Particularly suitable materials to be used as the thermoplastic layer of the heatable separating member are the following substances:

polyolefines, particularly polyethylene, atactic polypropylene, polybutene and the copolymers thereof;

ethylene-vinylacetate copolymers;

ethylene-acrylic acid copolymers;

ethylene-methacrylic acid copolymers and corresponding metal salts;

grafted and/or segmented ethylene vinylacetate copolymers;

ethylene-propylene-diene copolymers;

thermoplastic polyurethanes;

saturated polyesters and copolyesters;

Polyamides and copolyamides;

polyacrylates and polymethacrylates; and triblock and biblock copolymers, particularly copolymers consisting of polyamide, polyester and/or polyether blocks, and of polystyrene, polybutadiene and polyisobutylene blocks.

If adhesive beads made of a polyurethane based material are used, there may arise the difficulty that these beads show a poor adhesion to separating members made of polyethylene based materials. This difficulty can be avoided by using an ethylene-acrylic acid copolymer having 9 to 20% by weight of acrylic acid as a separating member. Such products are distributed by "The Dow Chemical Company", Midland Mich. 48674, USA, under the trade name "Primacor". Very well suitable products are, for instance, "Primacor 1430", "Primacor 5980" and "Primacor 5990".

Similar products on the basis of methacrylic acid and its metal salts are distributed by "Du Pont" under the trade name "Surlyn".

The electric conductivity of the material of the separating member, i.e. the layer, film or foil or the plastisol, can be created or improved by adding an electrically conductive material in fine dispersion to the base material during its preparation. Examples of such materials are listed below:

polymers having intrinsic conductivity;

electrically conductive carbon blacks;

graphite;

metallic powder, metallic fibres, metallic needles, particularly made of aluminum, copper, silver or tungsten;

fillers coated with metal, particularly coated with aluminum, copper, silver or tungsten;

metal coated micro balls and metal coated textile fibres; and mixtures of these materials.

Polymers having intrinsic conductivity are insoluble and not-meltable polymers the pi-electron system of which has been altered to a poly radical cation salt by protonation. Thereby, a high electrical conductivity of up to $10^2$ S/cm and more, corresponding to a resistivity of less than $10^{-2}$ Ohm.cm. Suitable representatives of such materials particularly are polyaniline (PAni) and its blend with polyvinyl chloride (PAni//PVC). Such products are distributed, for instance, by Zipperling Kessler & Co., D-2070 Ahrensberg, Germany, under the trade name "Versicon" and by Americhem Inc., Cuyahoga Falls, 44222-0375 Ohio, USA, under the trade name "Incoblend".

As metal coated textile fibres, particularly metal coated polyacrylonitrile fibres (PAN) are preferred. These fibres have a resistivity of less than $10^{-3}$ Ohm.cm, corresponding to a conductivity of more than $10^3$ S/cm. Such a product is distributed by Texmet, I-28100 Novara, Italy, under the trade name "Texmet".

If the heatable separating member is electrically conductive, the releasing of the adhesive joint, e.g. during repair of a vehicle, is accomplished by supplying an electric current to the separating member in order to heat it up. The heating of the separating member by means of electric energy can be performed by means of direct current or alternating current. In order to render ineffective possible breaks or gaps in the flat heatable separating member originating from breaking the vehicle pane, it is advantageous to use high frequency alternating current for heating the separating member.

On the other hand, if the separating member is constituted by a plastic material film or foil heatable under the influence of high frequency, micro wave or infrared radiation, a high frequency, micro wave or infrared radiation source is provided to heat the separating member. Of course it is required that the selected radiation really can reach the place where the heating should occur, be it due to the geometry of the adhesive bond, be it due to the kind of material of at least one of the elements to be fixed together. If one of the elements consists of glass as is usually the case with panes or windows for vehicles, this requirement is normally fulfilled as glass is permeable for the kinds of radiation mentioned above. In the case of an adhesive joint between two metallic elements, such a heating is possible only in the presence of a specific geometry of the adhesive joint.

Advantageously, the heating of the heatable separating member is performed to a temperature of at least 100° C., preferably to 150° C.

In the case of repair, i.e. in the case when a damaged vehicle pane has to be replaced by a new one, a separating surface in the adhesive joint as smooth as possible is desired which can serve as a basis for a new adhesive joint without the need for a follow-up treatment. Due to these reasons, the first embodiment of the adhesive joint according to the invention with a flat shaped heatable separating member is preferred.

In the case of disposal, however, i.e. when a vehicle has to be disassembled for recycling the different materials (steel, aluminum, glass, plastic etc.), the quality of the separating surface in the adhesive joint is of no further importance; thus, also other heatable separating members than flat shaped ones can be used. The same goes for particular geometric situations, for instance if very thin adhesive beads are present.

According to a further embodiment of the invention, the releasable adhesive joint comprises a first and a second adhesive bead whereby the first adhesive bead itself constitutes the heatable separating member. It will loose the adhesion to the closely fitting parts of the adhesive joint or will be destroyed upon heating the first adhesive bead to a temperature at which the second adhesive bead is not yet damaged, thus releasing the second adhesive bead closely fitting the first adhesive bead.

As a basis material for such adhesive beads serving simultaneously as heatable separating member, the products distributed by "The Dow Chemical Company", Midland, Mich. 48674, USA, under the trade name "Primacor Adhesive Polymer" is very suitable. Particularly good experiences have been made with the products distributed under the trade name "Primacor 5980" and "Primacor 5990".

BRIEF DESCRIPTION OF THE DRAWINGS

In the following, a number of preferred embodiments of the releasable adhesive joint will be further described, with reference to the accompanying drawings, in which.

DETAILED DESCRIPTION OF THE PREFERRED EMBODIMENTS

In the following description, reference is made to the drawings in which, as a typical example, a glass pane is shown which is fixed to the frame of a vehicle body. However, it is understood that the releasable adhesive joint in accordance with the invention can be used to fix two arbitrary elements to each other and the examples described hereinbelow are just illustrative.

Figure 1:
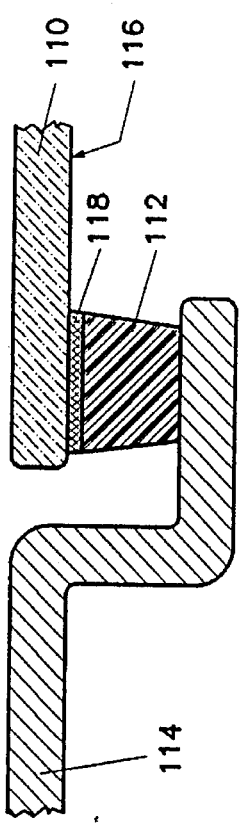
FIG. 1 shows a partial cross-sectional view of a vehicle pane mounted into a frame of a vehicle body by a releasable adhesive joint, according to a first embodiment.

FIG. 1 shows a vehicle body frame 114 in a partial cross-sectional view. A glass pane 110 is releasably mounted to the vehicle frame 114. For this purpose, there is provided a single adhesive bead 112 having trapezoidal cross section. Between the adhesive bead 112 and the surface 116 of the glass pane 110, there is provided a heatable separating member 118 constituted, for example, by a flat shaped thin plastic material foil made of a suitable material as hereinbefore described. If the heatable separating member 118 consists of an electrically conducting material, it is provided with electrical connectors (not shown) in order to be connected to a source of electric power to heat it up. If, however, the heatable separating member 118 consists of a material heatable under the influence of high frequency, micro wave or infrared radiation, no electric connectors are required.

The heatable separating member 118 closely fits both a edge portion of the surface 116 of the glass pane 110 and the surface of the adhesive bead 112 facing the glass pane 110. Thus, upon heating the separating member 118, the adhesion between the separating member 118 and the adhesive bead 112 is lost and the glass pane 110 can be removed easily from the vehicle body frame 114. After removal of the glass pane 110, the free surface of the adhesive bead 112 shows a smooth finish suitable for receiving a new glass pane 110 without the need for a follow-up treatment of this surface.

Figure 2:
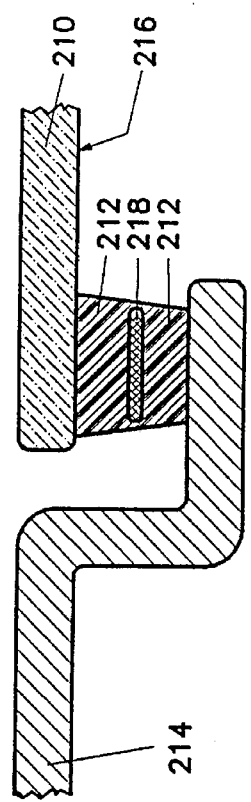
FIG. 2 shows a partial cross-sectional view of a vehicle pane mounted into a frame of a vehicle body by a releasable adhesive joint, according to a second embodiment.

According to FIG. 2, there is again provided a vehicle body frame 214 into which a glass pane 210 is fixed. For this purpose, there is provided a single adhesive bead 212 having trapezoidal cross section. The adhesive bead 212 closely fits the surface 216 of the glass pane 210 as well as an edge portion of the vehicle body frame 214. Embedded in the interior of the single adhesive bead 212, there is provided a heatable separating member 218 constituted, for example, by a flat shaped thin plastic material foil made of a suitable material as hereinbefore described. Preferably, the adhesive bead 212 and the heatable separating member 218 are applied to the surface 216 of the glass pane 210 by coextrusion.

If the heatable separating member 218 consists of an electrically conducting material, it is provided with electrical connectors (not shown) in order to be connected to a source of electric power to heat it up. If, however, the heatable separating member 218 consists of a material heatable under the influence of high frequency, micro wave or infrared radiation, no electric connectors are required.

Upon heating the separating member 218, the adhesion between the separating member 218 and the closely fitting upper and lower portions of the adhesive bead 212 is lost and the glass pane 210 can be removed easily from the vehicle body frame 214 because only a narrow edge portion of the adhesive bead 212 fixes the glass pane 210 to the frame 214. After removal of the glass pane 210, the free surface of the lower portion of the adhesive bead 212 shows a smooth finish suitable for receiving a new glass pane 210 without the need for a follow-up treatment of this surface.

Figure 3:
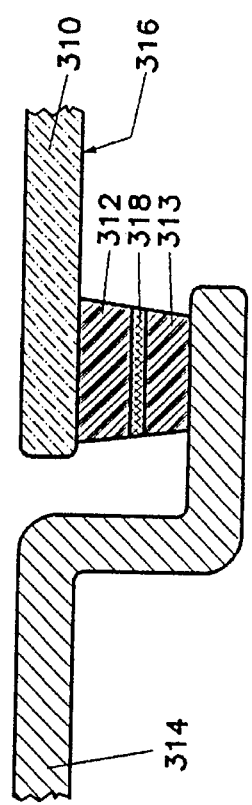
FIG. 3 shows a partial cross-sectional view of a vehicle pane mounted into a frame of a vehicle body by a releasable adhesive joint, according to a third embodiment.

According to FIG. 3, there is again provided a vehicle body frame 314 into which a glass pane 310 is fixed. For this purpose, there are provided two adhesive beads 312 and 313 together having trapezoidal cross section. The adhesive bead 312 closely fits the surface 316 of the glass pane 310 as well as the upper surface of a heatable separating member 318 inserted between the two adhesive beads 312 and 313. The adhesive bead 313 closely fits the lower surface of the heatable separating member 318 as well as an edge portion of the vehicle body frame 314. The heatable separating member 318 is constituted, for example, by a flat shaped thin plastic material foil made of a suitable material as hereinbefore described. If the heatable separating member 318 consists of an electrically conducting material, it is provided with electrical connectors (not shown) in order to be connected to a source of electric power to heat it up. If, however, the heatable separating member 318 consists of a material heatable under the influence of high frequency, micro wave or infrared radiation, no electric connectors are required.

Upon heating the separating member 318, the adhesion between the separating member 318 and the closely fitting upper and lower adhesive beads 312 and 313 is lost and the glass pane 310 can be removed easily from the vehicle body frame 314. After removal of the glass pane 310, the free surface of the lower adhesive bead 313 shows a smooth finish suitable for receiving a new glass pane 310 without the need for a follow-up treatment of this surface.

According to FIG. 4, there is again provided a vehicle body frame 414 into which a glass pane 410 is fixed. For this purpose, there are provided two adhesive beads 412 and 413. Inserted between the surface 416 of the glass pane 410 and the upper adhesive bead 412, there is provided a heatable separating member 418. The adhesive bead 412 closely fits the surface of the heatable separating member 418. The adhesive bead 413 closely fits the surface of the edge portion of the vehicle body frame 414. The heatable separating member 418 is constituted, for example, by a flat shaped thin plastic material foil made of a suitable material as hereinbefore described. If the heatable separating member 418 consists of an electrically conducting material, it is provided with electrical connectors (not shown) in order to be connected to a source of electric power to heat it up. If, however, the heatable separating member 418 consists of a material heatable under the influence of high frequency, micro wave or infrared radiation, no electric connectors are required.

In this embodiment, first the heatable separating member 418 is applied to the surface 416 of the glass pane 410. Thereafter, the first adhesive bead 412 is applied to the free surface of the heatable separating member 418 and then cured. After curing, the second adhesive bead 413 is applied to the first adhesive bead 412 and the glass pane thus prepared is inserted into the frame 414 and pressed thereagainst until also the second adhesive bead 413 is cured.

Upon heating the separating member 418, the adhesion between the separating member 418 and the closely fitting upper adhesive bead 412 is lost and the glass pane 410 can be removed easily from the vehicle body frame 414. After removal of the glass pane 410, the free surface of the upper adhesive bead 412 shows a smooth finish suitable for receiving a new glass pane 410 without the need for a follow-up treatment of this surface.

Figure 5:
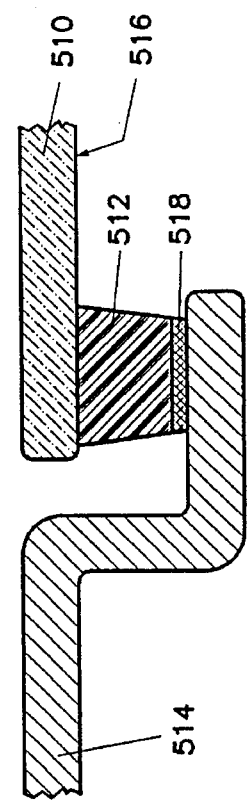
FIG. 5 shows a partial cross-sectional view of a vehicle pane mounted into a frame of a vehicle body by a releasable adhesive joint, according to a sixth embodiment.

FIG. 5 shows an embodiment similar to the one shown in FIG. 1 with a vehicle body frame 514 in a partial cross-sectional view. A glass pane 510 is releasably mounted to the vehicle frame 514. For this purpose, there is provided a single adhesive bead 512 having trapezoidal cross section. Between the adhesive bead 512 and the surface of the vehicle body frame 514, there is provided a heatable separating member 518 constituted, for example, by a flat shaped thin plastic material foil made of a suitable material as hereinbefore described. If the heatable separating member 518 consists of an electrically conducting material, it is provided with electrical connectors (not shown) in order to be connected to a source of electric power to heat it up. If, however, the heatable separating member 518 consists of a material heatable under the influence of high frequency, micro wave or infrared radiation, no electric connectors are required.

Figure 4:
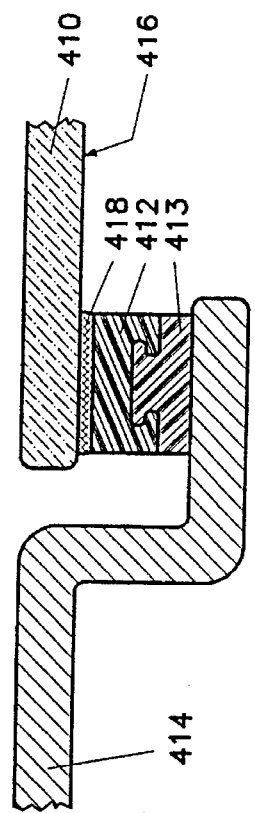
FIG. 4 shows a partial cross-sectional view of a vehicle pane mounted into a frame of a vehicle body by a releasable adhesive joint, according to a fourth embodiment.
Figure 6:
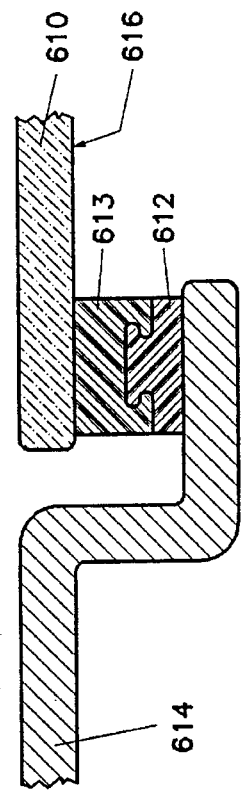
FIG. 6 shows a partial cross-sectional view of a vehicle pane mounted into a frame of a vehicle body by a releasable adhesive joint, according to a sixth embodiment.

FIG. 6 shows an embodiment similar to the one shown in FIG. 4 with a vehicle body frame 614 in a partial cross-sectional view. A glass pane 610 is releasably mounted to the vehicle frame 614. For this purpose, there are provided two adhesive beads 612 and 613. No separate heatable separating member is required, because in this embodiment, one of the two adhesive beads 612 and 613 is made of a suitable material as hereinbefore described, preferably the adhesive bead 612 which closely fits the surface of the vehicle body frame 614. If the heatable adhesive bead 612 consists of an electrically conducting material, it is provided with electrical connectors (not shown) in order to be connected to a source of electric power to heat it up. If, however, the heatable adhesive bead 612 consists of a material heatable under the influence of high frequency, micro wave or infrared radiation, no electric connectors are required.

Upon heating the adhesive bead 612, it looses its adhesion to the vehicle body frame 614 and/or to the second adhesive bead 613 such that the glass pane 610 can be easily removed, together with the second adhesive bead 613 which closely fits the surface 416 of the glass pane 610.

Figure 7:
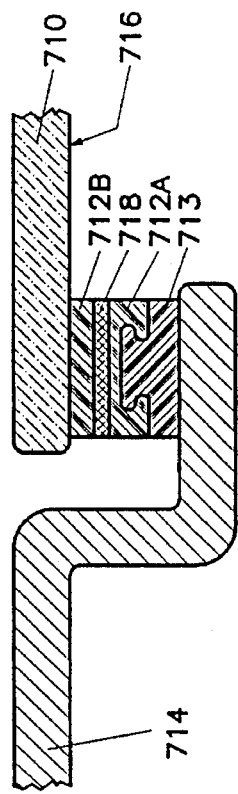
FIG. 7 shows a partial cross-sectional view of a vehicle pane mounted into a frame of a vehicle body by a releasable adhesive joint, according to a seventh embodiment.

FIG. 7 also shows an embodiment similar to the one shown in FIG. 4 with a vehicle body frame 714 in a partial cross-sectional view. A glass pane 710 is releasably mounted to the vehicle frame 714. For this purpose, there are provided two adhesive beads 712 and 713. A heatable separating member 718 is inserted between the upper portion 712B and the lower portion 712A of the first adhesive bead 712 which closely fits the surface 716 of the glass pane 710. The separating member 718 is made of a suitable material as hereinbefore described. If the heatable separating member 718 consists of an electrically conducting material, it is provided with electrical connectors (not shown) in order to be connected to a source of electric power to heat it up. If, however, the heatable separating member 718 consists of a material heatable under the influence of high frequency, micro wave or infrared radiation, no electric connectors are required.

The lower adhesive bead 713 closely fits both the lower portion 712A of the first adhesive bead 712 as well as the surface of the vehicle body frame 714.

In this embodiment, first the adhesive bead 712 consisting of the upper and lower portions 712B and 712A together with the heatable separating member 718 is applied to the surface 716 of the glass pane 710, preferably by coextrusion and then cured. After curing, the second adhesive bead 713 is applied to the first adhesive bead 712 and the glass pane 710 thus prepared is inserted into the frame 714 and pressed there-against until also the second adhesive bead 713 is cured.

Upon heating the separating member 718, it looses its adhesion to the upper portion 712B and/or to the lower portion 712A of the adhesive bead 712 such that the glass pane 710 can be easily removed, together with the first portion 712B of the adhesive bead 713 which closely fits the surface 716 of the glass pane 710. After removal of the glass pane 710, the free surface of the lower portion 712A of the adhesive bead 712 shows a smooth finish suitable for receiving a new glass pane 710 without the need for a follow-up treatment of this surface.

Figure 8:
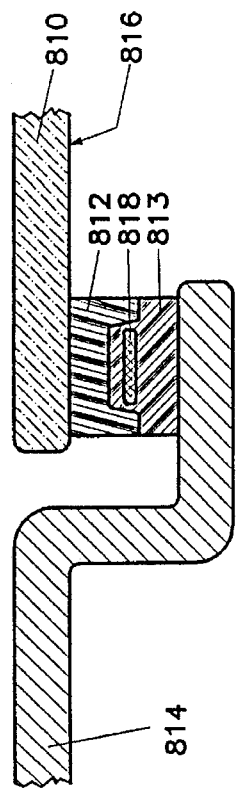
FIG. 8 shows a partial cross-sectional view of a vehicle pane mounted into a frame of a vehicle body by a releasable adhesive joint, according to a eighth embodiment.

Finally, FIG. 8 also shows an embodiment similar to the one shown in FIG. 4 with a vehicle body frame 814 in a partial cross-sectional view. A glass pane 810 is releasably mounted to the vehicle frame 814. For this purpose, there are provided two adhesive beads 812 and 813. A heatable separating member 818 is embedded in the adhesive bead 813 which closely fits the surface of the vehicle body frame 814. The adhesive bead 812 closely fits the surface 816 of the glass pane 810.

The separating member 818 is made of a suitable material as hereinbefore described. If the heatable separating member 818 consists of an electrically conducting material, it is provided with electrical connectors (not shown) in order to be connected to a source of electric power to heat it up. If, however, the heatable separating member 818 consists of a material heatable under the influence of high frequency, micro wave or infrared radiation, no electric connectors are required.

The lower adhesive bead 813 closely fits both the upper adhesive bead 812 as well as the surface of the vehicle body frame 814.

In this embodiment, first the adhesive bead 812 together with the heatable separating member 818 is applied to the surface 816 of the glass pane 810, preferably by coextrusion, and then cured. After curing, the second adhesive bead 813 is applied to the first adhesive bead 812 and the glass pane 810 thus prepared is inserted into the frame 814 and pressed thereagainst until also the second adhesive bead 813 is cured.

Upon heating the separating member 818, it looses its adhesion to the lower adhesive bead 813 such that the glass pane 810 can be easily removed, together with the upper adhesive bead 813 which closely fits the surface 816 of the glass pane 810 because the two adhesive beads 812 and 813 are connected to each other only by very small edge portions which easily can be destroyed.

EXAMPLES OF APPLICATION

The following examples of application describe heating tests which have been performed with electrically conductive polymer foils.

Example 1

In this example, use was made of a foil distributed under the trade name "PE 105 LF", i.e. a polyethylene rendered electrically conductive by adding carbon black thereto, by Zipperling Kessler & Co., D-2070 Ahrensberg, Germany. The resistivity of this material amounts to 0.5 ohm.cm, corresponding to a conductivity of 2 S/cm. It has been tested in the form of an elongated tape.

| | Test Conditions | | |
|---|---|---|---|
| Tape length: | 400 cm | 200 cm | 200 cm |
| Tape width: | 10 mm | 10 mm | 10 mm |
| Tape thickness: | 1 mm | 1 mm | 1 mm |
| Frequency: | 50 cps | 50 cps | 50 cps |
| Voltage (AC): | 260 V | 260 V | 260 V |
| Initial Temperature: | 30° C. | 30° C. | 30° C. |
| | Initial Measurement Values | | |
| Resistance: | 3200 ohm | 1900 ohm | 940 ohm |
| Power Consumption: | 21.13 W | 35.58 W | 71.91 W |
| | Measured Values after 5 min | | |
| Temperature: | 40° C. | 55° C. | 100° C. |
| Heating Time | 5 min | 5 min | 3.5 min[1] |
| Resistance: | 3300 ohm | 2100 ohm | 1700 ohm |
| Power Consumption: | 20.48 W | 32.19 W | 39.76 W |

[1] Soft after 2 min, sticky after 3 min, test stopped after 3.5 min.

Example 2

In this example, use was made of a foil distributed under the trade name "Primacor 5980" containing 20% by weight carbon black and 5% by weight polyacrylonitrile fibres coated with nickel, a test product of "Texmet", I-28100 Novara, Italy The resistivity of this material amounts to 0.1 ohm.cm, corresponding to a conductivity of 10 S/cm. It has been tested in the form of an elongated tape.

| | Test Conditions | | |
|---|---|---|---|
| Tape length: | 400 cm | 200 cm | 200 cm |
| Tape width: | 10 mm | 10 mm | 10 mm |

-continued

| | | | |
|---|---|---|---|
| Tape thickness: | 2 mm | 2 mm | 2 mm |
| Frequency: | 50 cps | 50 cps | 50 cps |
| Voltage (AC): | 260 V | 260 V | 260 V |
| Initial Temperature: | 30° C. | 30° C. | 30° C. |
| Initial Measurement Values | | | |
| Resistance: | 350 ohm | 200 ohm | 120 ohm |
| Power Consumption: | 195 W | 340 W | 560 W |
| Measured Values after 5 min | | | |
| Temperature: | >100° C. | >100° C. | >100° C. |
| Heating Time | 2 min[1] | 1 min[1] | 0.5 min[1] |
| Resistance: | 3300 ohm | 2100 ohm | 1700 ohm |
| Power Consumption: | 20.48 W | 32.19 W | 39.76 W |

[1] Heating test terminated, since the polymer had molten.

What is claimed is:

1. A releasable adhesive joint between a vehicle pane component and a vehicle body frame component comprising:
   a) a first adhesive bead directly contacting the vehicle pane component and a second adhesive bead directly contacting the vehicle body frame component,
   b) a strip of thermoplastic polymeric material having opposed sides, said strip of thermoplastic polymeric material being between and directly contacting said first and second adhesive beads, said strip of thermoplastic material having an essentially uniform composition throughout and being heatable by radiation or flow of electric current to a temperature below that at which at least one of said beads is damaged and, when heated by said radiation or flow of electric current to said temperature, having reduced adherence to said at least one adhesive bead contacted by said strip of thermoplastic material.

2. A releasable adhesive joint between a vehicle pane component and a vehicle body frame component comprising:
   a) an adhesive bead comprising a first portion directly contacting the vehicle pane component and a second portion directly contacting the vehicle body frame component:
   b) a strip of thermoplastic polymeric material having opposed sides, said strip of thermoplastic polymeric material being embedded in said adhesive bead between said first and second portions, said strip of thermoplastic material having an essentially uniform composition throughout which is heatable by radiation or the flow of an electric current through the strip to a temperature below that at which the adhesive bead is damaged, and when heated by said radiation or the flow of an electric current to said temperature, having reduced adherence to said bead effective to separate said first and second portions.

3. The adhesive joint of claim 2 wherein said adhesive bead and strip of thermoplastic material are co-extruded together.

4. A releasable adhesive joint between a vehicle pane component and a vehicle body frame component comprising:
   a) at least one adhesive bead directly contacting the vehicle pane component or the vehicle body frame component:
   b) a strip of thermoplastic polymeric material having opposed sides, said strip, on one side, directly contacting said adhesive bead and being adhered to said bead, and on the opposite side, being secured to the vehicle component not contacted by said adhesive bead, said strip of thermoplastic polymeric material having an essentially uniform composition throughout which is heatable by the flow of an electric current through the strip to a temperature below that at which the adhesive bead is damaged, and when heated by said flow of electric current to said temperature, having reduced adherence to said adhesive bead, wherein said strip of thermoplastic polymeric material comprises electrically conductive additives uniformly dispersed therein.

5. A releasable adhesive joint between a vehicle pane component and a vehicle body frame component comprising:
   a) an adhesive bead directly contacting the vehicle pane component or the vehicle body frame component:
   b) a, strip of thermoplastic polymeric material having opposed sides, said strip, on one side, directly contacting said adhesive bead and being adhered to said bead, and on the opposite side, directly contacting the vehicle component not contacted by said adhesive bead, said strip of thermoplastic material having an essentially uniform composition throughout and being a polymeric material heatable by radiation or containing electrically conductive additives so as to be heatable by the flow of an electric current through the strip to a temperature below that at which the adhesive bead is damaged, and when heated by said radiation or flow of electric current to said temperature, having reduced adherence to said adhesive bead.

6. A releasable adhesive joint between two elements, said two elements being fixed to each other by at least one adhesive bead, said adhesive joint comprising a heatable thermoplastic polymeric separating member contiguous with said at least one adhesive bead or embedded in said at least one adhesive bead, said heatable thermoplastic polymeric separating member loosing its adhesion to said at least one adhesive bead of the adhesive joint, or being destroyed, upon heating said heatable separating member to a temperature at which said at least one adhesive bead is not yet damaged, thus releasing said at least one adhesive bead from said heatable separating member; wherein said heatable separating member is an electrically conductive thermoplastic polymeric layer which is in the shape of a flat body member having an essentially uniform composition throughout comprising electrically conductive additives, in an effective amount to make said heatable separating member conductive, selected from the group consisting of:
   a) polymers having intrinsic conductivity selected from the group consisting of polyaniline and a blend of polyaniline and polyvinyl chloride;
   b) metal coated fillers selected from the group consisting of metal coated micro glass balls and metal coated textile fibers.

* * * * *